Patented May 6, 1947

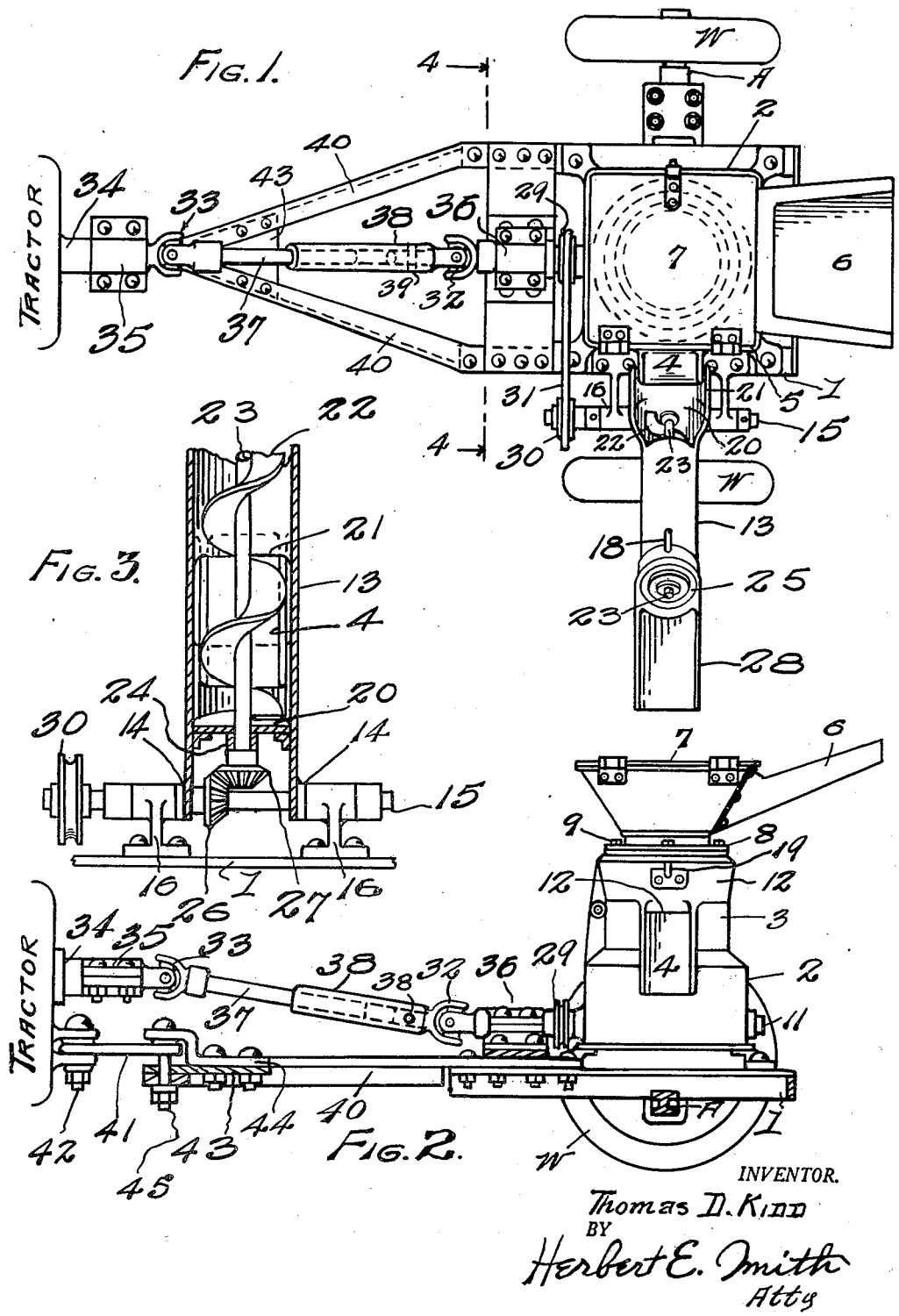

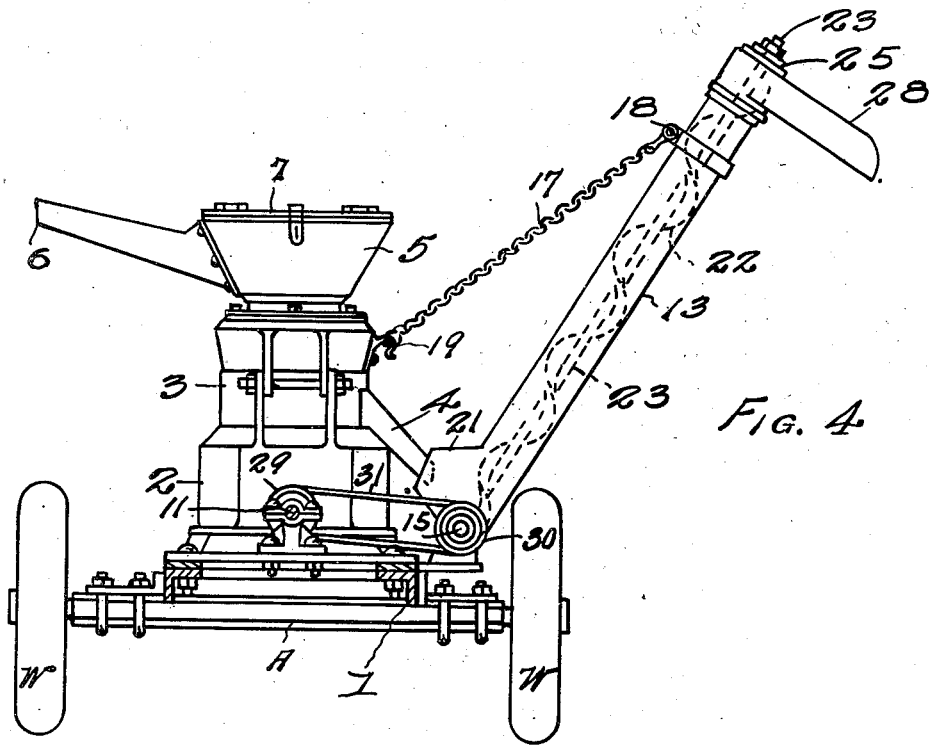

2,420,247

UNITED STATES PATENT OFFICE 2,420,247

CONVEYOR MECHANISM FOR PORTABLE GRINDING MILLS

Thomas D. Kidd, Mendota, Ill., assignor of fifty one-hundredths to Ray Kreiser, Mendota, Ill.

Application September 20, 1944, Serial No. 554,941

4 Claims. (Cl. 198—53)

The present invention relates to an improved portable grinding mill embodied in a wheeled implement adapted to be towed or transported by an automotive vehicle, as a farm tractor, which also furnishes power to operate the rotary grinding mill while the implement is stationary. The implement is especially designed for itinerant work, or custom grinding, where the mill is transported by the tractor from farm to farm, and operated at stations convenient to the farmers.

To insure convenient and rapid transit, the tractor and wheeled implement are compactly hitched together; and to attain smooth transmission of power from the stationary tractor and achieve efficient operation of the grinding mill, the power shaft of the tractor and the operating shaft of the grinding mill and its combined delivery-conveyer are flexibly coupled together for cooperation.

The draft rigging, and the power transmission mechanism, between the tractor and the implement, are co-ordinated for facile assembly of parts; for separate and alternate performance of their respective functions; and, when desirable, these essential parts may readily be disconnected for the purpose of detaching the wheeled implement from the tractor.

The invention consists essentially in certain novel combinations and arrangements of parts, and one embodiment of the invention is illustrated in the accompanying drawings and more particularly set forth in the specification and claims.

Figure 1 is a top plan view of the implement, indicating its relation to a tractor from which power is supplied, and showing the parts in operative position.

Figure 2 is a side elevation of the implement in Figure 1, with parts in section, and other parts omitted for convenience of illustration.

Figure 3 is an enlarged detail sectional view showing the operation of the screw-conveyer, and its relation to the lateral outlet port and discharge chute of the grinding mill.

Figure 4 is a transverse vertical sectional view, as at line 4—4 of Figure 1, but showing the swiveled feed hopper turned at an angle of forty-five degrees from the position of Figure 1.

Figure 5 is a detail sectional view showing the swiveled arrangement of the feed hopper.

In the assembly views it will be seen that a rectangular main frame 1 is horizontally disposed and mounted on a transversely extending axle A, and the pair of supporting wheels W are journaled on the opposite ends of the axle, the frame and axle being rigidly joined or fastened together in suitable manner to support the operating parts of the implement.

The rotary grinding mill, which is of well known type, is bolted at its base 2 to the main frame 1 and arranged symmetrically over the axle, the intermediate cylinder 3 being provided with an inclined, lateral, chute 4 to receive ground material from the port 12, in the side wall of the cylinder.

The material to be ground is fed to the mill through the top rectangular feed hopper 5, which is preferably fashioned with an attached inclined trough or funnel 6, and a hinged top or lid 7 giving convenient access to the interior of the mill.

As best seen in Figure 5, the feed hopper is swiveled upon the top of the cylinder 3, through the instrumentality of a swivel ring 8 that is bolted at 9 to the cylinder and overlaps an exterior annular flange 10 fashioned at the open bottom of the feed hopper. The swiveled hopper may be manually turned or rotatably adjusted to different positions, as indicated in Figures 1 and 4, in order to facilitate feeding operations when the implement is stationary. When the implement is to be towed by the tractor, or otherwise transported, the swiveled hopper is adjusted to desired position for properly locating the center of gravity of the wheeled implement.

The upright spindle and grinding elements, or mill-stones, within the mill (but not shown) are rotated through transmission means by the horizontal, longitudinally extending operating shaft 11 which passes through and is journaled in bearings in the base of the mill. The ground material flows through the outlet port 12 and down the discharge chute 4 to a screw conveyer, which is located at one side of the implement, and adjustable in a vertical plane to convey the ground material and deliver it to a storage bin or other receptacle.

As here shown the conveyer includes a cylindrical tube or spout of convenient length, as 13, which is journaled in bearings as 14 at its lower end on an auxiliary shaft 15 disposed parallel with the operating shaft 11 of the mill. The auxiliary shaft is journaled in bearing brackets 16 that are bolted to the main frame 1, and located at opposite front and rear sides of the lower end of the delivery spout 13.

The adjustable spout may be swung in a vertical plane through an arc toward and away from the mill, with the auxiliary shaft 15 as its pivot, and when so adjusted, as in Figure 4, it may be retained in desired position by any suitable fastening means, as for instance, a chain 17 which is anchored at 18 near the outer end of the conveyer, and with its inner end coupled to a hook 19 attached to the mill. For transportation purposes the conveyer is swung over into proximity with the mill, and then fastened to the mill by the chain in appropriate manner. The utility of the chain is best illustrated in Figure 4, but it is omitted from Figures 1 and 2 in the interest of clearness, or clarity.

The lower end of the spout or pipe 13 is closed by a transverse plate 20, and the ground grain flows into the collection space or chamber formed by this plate from the discharge chute 4, through an intake port 21 (Fig. 3), where the ground material is picked up by a spiral conveyer, or screw 22 that revolves with its shaft 23. The shaft 23, which extends throughout the length of the conveyer spout 13, is journaled in end bearings 24 and 25 of the spout, and power is transmitted to the lower end of the shaft 23 from the operating shaft 15 through a bevel gear couple 26—27 between the two shafts.

The milled grain is conveyed through the interior of the delivery spout 13, and discharged through an outlet trough 28 at the upper end of the spout, for delivery into a bin or other suitable storage receptacle.

Power for operating the auxiliary shaft 15 and the screw conveyer may be transmitted from the operating shaft 11 in any suitable manner, as by means of a drive wheel 29 on shaft 11, a wheel 30 on the auxiliary shaft, and a conventional drive belt 31.

In Figures 1 and 2 a tractor is indicated, to furnish power for operating the implement, and also to provide means for towing or transporting the wheeled implement from one farm, or place of operation, to another place for operation. The draft gear and the power transmitting means between the tractor and the wheeled implement are combined and arranged in such manner as to simplify and facilitate smooth performance in the functions of the operating parts of the mill; and to insure safety, reliability, and convenience and steering and maneuvering the tractor and implement while the latter is being transported.

The power transmission means between the tractor and the implement comprises a flexible, telescopic, coupling, including a rear universal joint 32 and a front universal joint 33, the latter being coupled with the power shaft 34 of the tractor, which shaft is shown journaled in bearings 35. The rear universal joint 32 is an extension of the operating shaft 11 and is journaled in a bearing 36 on the main frame 1 of the implement. The intermediate portion of the flexible shaft between the two universal joints includes two telescopic sections 37 and 38, and an emergency pin 39 is indicated as joining two parts of the flexible shaft, i. e., section 38 and joint 32. This pin is designed to be broken under excessive strains or shocks imposed on the flexible shafts, thus preserving the shaft against breakage of more important parts. The universal joints and the telescopic sections of the flexible shaft compensate for and absorb lost motions encountered in transmission of power, and power is transmitted from the tractor through the flexible shaft to the implement with uniformity and efficiency.

The draft rigging between the tractor and the wheeled implement includes a flexible coupling located beneath the flexible shaft and in the same vertical plane therewith with co-axial pivotal connections, in order that the implement, while being towed, may swing without danger of breaking the transmission couplings and the draft couplings. For this purpose, the main frame is provided with radius bars 49, 40, forming a converging extension provided with a joint plate 43 and clevis 44, for the main coupling pin 45. The pin 45 is passed through a link 41, which is flexibly coupled with a part of the tractor by coupling pin 42.

It will be seen that the coupling pin 45, forming one of the flexible connections of the draft rigging, is located directly below the universal joint 33 of the flexible power transmission shaft to insure co-action, as described, with the flexible shaft, in compensating for irregularities encountered while towing the implement.

While I have illustrated one complete example of the physical embodiment of my invention, it will be understood that changes and alterations may be made in the exemplifying drawings, without departing from the principles involved in the appended claims.

A conventional form of rotary grinding mill, employing the well known interior upright spindle and grinding stones or burrs, is illustrated and has been described, for milling wheat, oats, and other grains, but it will be understood the invention may readily be adapted for use with different types of rotary grinding mills for milling other materials.

In this specific embodiment of the invention, the close-coupled, short-turning, and compactly arranged appliance, as a whole, may readily be backed with the mill in position to receive the material from the farmer's grain supply, and to convey and deliver the milled material, rapidly, to a storage receptacle or bin, at the convenience of the farmer.

The swiveled feed hopper with its trough may be swung into close proximity to the grain cribs or bins in order that the grain may be shoveled directly to the trough and then uniformly fed to the mill, with minimum labor, and without loss of time.

The screw conveyor may also be quickly adjusted, and held in proper position to receive the milled material and deliver it directly to a storage receptacle, thus dispensing with the service of laborers in storing the products of the mill.

The mechanical devices employed in the power transmission mechanism, in the draft rigging or appliance, and in the auxiliary operating mechanism, as here shown, cooperate and co-act to secure smooth performance of their functions, but under some conditions changes may be made in these combinations and arrangements of parts, to meet other requirements.

Having thus fully described my invention, what I claim as new and desire to secure by Letters Patent is:

1. In a grinding mill, the combination with a lower operating shaft and drive means therefor, an upper horizontally swiveled feed hopper, and a lateral discharge port and chute, of an auxiliary driven shaft and power transmission means between said shaft and the operating shaft, a screw conveyer having an intake end co-acting with the chute and pivotally supported on the auxiliary shaft, and a bevel gear-couple between the auxiliary shaft and the screw conveyer.

2. In a grinding mill, the combination of a feed hopper adjustable in a horizontal plane, a fixed lateral discharge port and chute from the mill, a lower operating shaft and drive means therefore, an auxiliary shaft and transmission means between said shaft and the operating shaft, a conveyer spout pivotally supported on the auxiliary shaft and having an intake co-acting with the chute, a screw-conveyer within the spout, and power transmission means between the auxiliary shaft and screw conveyer.

3. In a grinding mill the combination of a swiveled feed hopper, a fixed lateral discharge port and chute, a vertically adjustable conveyer spout pivotally mounted adjacent the chute with its intake port in position to receive ground material from the chute, a lower operating shaft, a conveyor in the conveyor spout, a drive shaft for said conveyor extending across the lower end of the spout and forming a pivotal support therefor, and power transmission means connecting said shafts.

4. The combination in a portable grinding mill having a fixed discharge chute, a main frame and a longitudinal operating shaft journaled thereon, of a screw discharge conveyer pivotally supported on the main frame and having an intake port projecting laterally therefrom around the chute to co-act with said chute, power transmission means between the operating shaft and said conveyer and a pivotal support for said conveyor comprising a shaft forming part of said power transmission means.

THOMAS D. KIDD.

REFERENCES CITED

The following references are of record in the file of this patent:

UNITED STATES PATENTS

| Number | Name | Date |
|---|---|---|
| 1,257,619 | Lincoln | Feb. 26, 1918 |
| 1,595,836 | Gundlach | Aug. 10, 1926 |
| 1,834,100 | Knapp | Dec. 1, 1931 |
| 1,985,888 | Day | Jan. 1, 1935 |
| 2,276,903 | Welty | Mar. 17, 1942 |
| 2,348,916 | Magnus | May 16, 1944 |

FOREIGN PATENTS

| Number | Country | Date |
|---|---|---|
| 13,900/33 | Australia | Mar. 7, 1934 |
| 645,140 | Germany | May 22, 1937 |

OTHER REFERENCES

Form 560 of Pioneer Gravel Equipment Mfg. Co., 1515 Central Ave., Minneapolis, Minn., entitled "Bring the Crusher to the rock with the Pioneer Crusher Trailer," page 4.